(12) United States Patent
Barrus et al.

(10) Patent No.: US 9,298,685 B2
(45) Date of Patent: Mar. 29, 2016

(54) AUTOMATIC CREATION OF MULTIPLE ROWS IN A TABLE

(71) Applicants: John W. Barrus, Menlo Park, CA (US); Edward L. Schwartz, Menlo Park, CA (US)

(72) Inventors: John W. Barrus, Menlo Park, CA (US); Edward L. Schwartz, Menlo Park, CA (US)

(73) Assignee: Ricoh Company, Ltd., Tokyo (JP)

( * ) Notice: Subject to any disclaimer, the term of this patent is extended or adjusted under 35 U.S.C. 154(b) by 314 days.

(21) Appl. No.: 13/781,719

(22) Filed: Feb. 28, 2013

(65) Prior Publication Data

US 2014/0245119 A1  Aug. 28, 2014

(51) Int. Cl.
  *G06F 17/20*  (2006.01)
  *G06F 17/24*  (2006.01)
  *G06F 3/0481*  (2013.01)
  *G06F 9/44*  (2006.01)

(52) U.S. Cl.
  CPC ............ *G06F 17/243* (2013.01); *G06F 3/0481* (2013.01); *G06F 9/4446* (2013.01)

(58) Field of Classification Search
  CPC ..... G06F 17/243; G06F 3/0481; F06F 9/4446
  See application file for complete search history.

(56) References Cited

U.S. PATENT DOCUMENTS

| | | | | |
|---|---|---|---|---|
| 5,235,654 A * | 8/1993 | Anderson | ............. | G06F 17/243 101/485 |
| 5,721,940 A * | 2/1998 | Luther | .................. | G06F 17/243 715/200 |
| 6,502,101 B1 * | 12/2002 | Verprauskus | ..... | G06F 17/30569 |
| 6,631,497 B1 * | 10/2003 | Jamshidi | ........... | G06F 17/30569 707/E17.006 |
| 6,684,222 B1 * | 1/2004 | Cornelius | ........... | G06F 17/3061 |
| 7,069,240 B2 * | 6/2006 | Spero | ..................... | G06Q 20/20 705/26.35 |
| 7,870,477 B2 * | 1/2011 | Perelman | .............. | G06F 17/243 715/221 |
| 8,285,604 B1 * | 10/2012 | Trandal | .................. | G06Q 30/02 705/26.7 |
| 8,601,361 B2 * | 12/2013 | Berger | .............. | G06F 17/30569 715/224 |
| 2003/0033317 A1 * | 2/2003 | Ziglin | ............... | G06F 17/30557 |
| 2004/0172590 A1 * | 9/2004 | Rothschiller | ....... | G06F 17/2247 715/212 |
| 2007/0168382 A1 * | 7/2007 | Tillberg | ............ | G06F 17/30253 |
| 2009/0119574 A1 * | 5/2009 | Gitlin | .................... | G06F 17/243 715/209 |

OTHER PUBLICATIONS

ExcelFunctions.Net, "The Excel Advanced Filter," Jan. 24, 2009 (retrieved Mar. 5, 2015) (available at http://www.excelfunctions.net/ExcelAdvancedFilter.html).*

* cited by examiner

*Primary Examiner* — Stephen Hong
*Assistant Examiner* — Shahid Khan
(74) *Attorney, Agent, or Firm* — Patent Law Works LLP

(57) ABSTRACT

A system and method for creating a table including multiple rows to accommodate redundant field information is described. A table creation module receives a completed form, generates field images, determines a set of unique field images, redundant fields and associated fields in the completed form, populates a first row of the table in a first column with a first unique field image, adds remaining field images from the set of unique field images to the first row, populates the first row with a first redundant field image and remaining field images from a first set of associated fields. The tables can be used to create an organized report.

20 Claims, 11 Drawing Sheets

○⸺▸ Labels ▭⸺▸ Redundant field ▭⸺▸ Associated fields

XYZ  Expense Report

| Name: | | Date: | |
|---|---|---|---|
| Email: | | Dept | ▼ |
| Purpose: 321 | | | |

Receipted Items Worksheet

| 301 Expense Category | Descriptions 303 | 305 Amount 313 |
|---|---|---|
| $A_1$ ▼ | $B_1$ | $C_1$ |
| $A_2$ 307 ▼ | $B_2$ 309 | $C_2$ 311 |
| $A_3$ ▼ | $B_3$ | $C_3$ |
| $A_4$ ▼ | $B_4$ | $C_4$ |

Per Diem Worksheet

| Destination | Rate | Days | Amount |
|---|---|---|---|
| 315 | 323 ▼ | 317 | 319 |

Mileage Worksheet

| Destination | Rate/Mile | Miles | Amount |
|---|---|---|---|
| $D_1$ | $0.55 | $E_1$ | $F_1$ |
| $D_2$ | $0.55 | $E_2$ | $F_2$ |

| | | Total: | |
|---|---|---|---|

Authorizing Signatures:

Employee:

Manager:

Accounting:

*XYZ company, inc.*

XYZ     401     Expense Report

| Name: | Oscar Mike | Date: | 7/1/2013 | 405 |
|---|---|---|---|---|
| Email: | mike@xyz.com | Dept | Engineering | ▼ |

Purpose:    407       409       411

Receipted Items Worksheet

| Expense Category | Description | Amount |
|---|---|---|
| Travel ▼ | Taxi ride | $35 |
| Travel ▼ | Boston flight ticket | $467 |
| Promotion ▼ | Business lunch | $203 |
| Consultant fees ▼ | Cams project expense | $936 |

403

Per Diem Worksheet

| Destination | Rate | Days | Amount |
|---|---|---|---|
|  | ▼ |  |  |

Mileage Worksheet

| Destination | Rate/Mile | Miles | Amount |
|---|---|---|---|
| 413 San Jose Airport | $0.55 | 40 | $22 |
| 415 Little America hotel | $0.55 | 60 | $33 |

Total: [ ]

Authorizing Signatures:

Employee:

Manager:

Accounting:

*XYZ company, inc.*

| Document Management |
|---|

Open  Close  Preferences  Fit 100%  Blank Form  Exit

| Blank Form | Spreadsheet | Forms | Single Form - Edit |
|---|---|---|---|

18 rows   Mode: Strokes   Auto Refresh: Off   View: Unsaved View

| Name 502 | Date 504 | Email 506 | Dept 508 | Expense Category 515 | Description 517 | Amount | Destination 519 | Miles | Amount |
|---|---|---|---|---|---|---|---|---|---|
| Oscar Mike | 7/1/2013 | mike@xyz.com | Engineering | Travel | Taxi ride | $35 | | | |
| Oscar Mike | 7/1/2013 | mike@xyz.com | Engineering | Travel | Boston flight ticket | $467 | | | |
| Oscar Mike | 7/1/2013 | mike@xyz.com | Engineering | Promotion | Business lunch | $203 | | | |
| Oscar Mike | 7/1/2013 | mike@xyz.com | Engineering | Consultant fees | Canvs project expense | $936 | | | |
| Oscar Mike 567 | 7/1/2013 | mike@xyz.com | Engineering | | | | San Jose Airport | 40 | $22 |
| Brooke Green | 10/1/2013 | bg@xyz.com | Sales | Travel | NY flight | $230 | | | |
| Brooke Green 569 | 10/1/2013 | bg@xyz.com | Sales | | | | Little America hotel | 60 | $33 |
| LeRoy McKay | 13/1/2013 | royz@xyz.com | Accounting | Consultant fees | OS upgrade | $1232 | Tech expo | 15 | $8.25 |
| LeRoy McKay | 13/1/2013 | royz@xyz.com | Accounting | Utility | Electricity fees | $1645 | | | |

Dates: All   Apply

Figure 5B

| Document Management | | | | | | | | |
|---|---|---|---|---|---|---|---|---|
| Open Close Preferences Fit 100% Blank Form Exit | | | | | | | | |
| Blank Form | Spreadsheet | Forms | Single Form - Edit | | | | | |

18 rows     Mode: [ Strokes ]     Auto Refresh: [Off] 587     View [ Unsaved View ▼▲ ]

| Name 502 | Date | Email | Dept | Expense Category | Description | Amount | Destination | Miles |
|---|---|---|---|---|---|---|---|---|
| Oscar Mike | 7/1/2013 | mike@xyz.com | Engineering | Travel | Taxi ride | $35 | 589 | |
| Oscar Mike | 7/1/2013 | mike@xyz.com | Engineering | Travel | Boston flight ticket | $467 | | |
| Brooke Green 567 | 10/1/2013 | bg@xyz.com | Sales | Travel | NY flight | $230 | | |
| | | | | Expense Category: Travel Sub-total: $732  591 | | | | |

581

Label: [ Expense Category ▼ ]     Filter: [ Travel ▼ ] 583     [ Apply ] 585

AUTOMATIC CREATION OF MULTIPLE ROWS IN A TABLE

BACKGROUND OF THE INVENTION

1. Field of the Invention

The specification relates to a system and method for creating a table including multiple rows from one or more forms. In particular, the specification relates to creating a table including multiple rows to accommodate redundant field information from the one or more forms.

2. Description of the Background Art

Portable computing devices can be used to input information into forms. Users will input information using a stylus, and the form will be stored as a flat file for processing the form. A table can be created from multiple forms. However, a new column will be created for information in each field in the form, which can result in having columns with redundant information. This makes querying the forms very difficult.

SUMMARY OF THE INVENTION

The disclosure overcomes the deficiencies of the prior art with a system and method for creating a table including multiple rows to accommodate redundant information on forms. In one embodiment, an Image Based Document Management (IBDM) server includes a table creation module. The table creation module is configured to receive completed form data for forms, generate field images from the completed form data, determine a set of unique field images, redundant fields and associated fields in the completed form, populate a first row of the table in a first column with a first unique field image, add remaining field images from the set of unique field images to the first row, populate the first row with a first redundant field image and remaining field images from a first set of associated fields, determine whether a next redundant field image is a part of a next set of associated fields redundant with the first set, add the next set of associated fields to the same column as the first set in the next row responsive to determining that the next redundant field image is a part of the next set and add the first unique field image in the first column of the next row and the remaining field image from the set of unique field images to the next row. In one embodiment, the table creation module is configured to create a next column in the table responsive to failing to determine that the next redundant field image is a part of the next set of associated fields that are redundant with the first set, add the next redundant field image and the remaining field images in its set of associated fields in the next row and in the next column of the table and add the first unique field image in the first column of the next row and the remaining field image from the set of unique field images to the next row.

Other aspects include corresponding methods, systems, apparatuses, and computer program products for these and other innovative aspects.

This results in form processing that is less computationally expensive and faster processing. The features and advantages described herein are not all-inclusive and many additional features and advantages will be apparent in view of the figures and description. Moreover, it should be noted that the language used in the specification has been principally selected for readability and instructional purposes, and not to limit the scope of the subject matter disclosed herein.

BRIEF DESCRIPTION OF THE DRAWINGS

The invention is illustrated by way of example, and not by way of limitation in the figures of the accompanying drawings in which like reference numerals are used to refer to similar elements.

FIG. 3 is a graphic representation of an embodiment of a user interface that highlights redundant fields and a set of associated fields in the form.

FIG. 4 is a graphic representation of an example form including handwriting strokes.

FIG. 5A is a graphic representation of an embodiment of a user interface that displays a table including multiple rows generated for a single form.

FIG. 5B is a graphic representation of an embodiment of a user interface that displays a table including multiple rows generated per form for a plurality of forms.

FIG. 5C is a graphic representation of an embodiment of a user interface that displays a modified table in response to receiving a request and rearranging the content in the table.

DETAILED DESCRIPTION OF THE PREFERRED EMBODIMENTS

Figure 1:
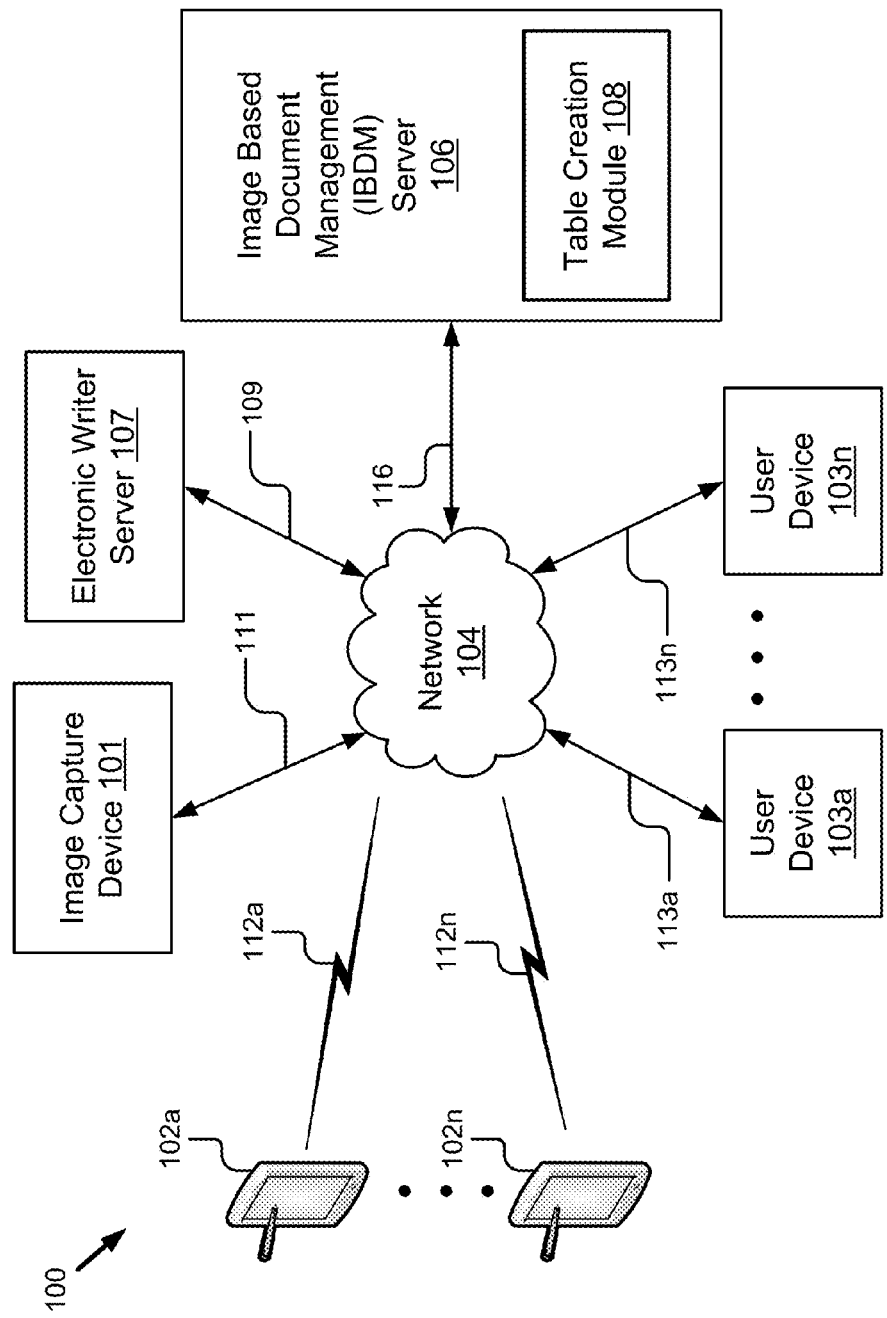
FIG. 1 is a high-level block diagram illustrating one embodiment of a system for creating a table from one or more forms.

A description of a system and method for creating a table including multiple rows for accommodating redundant field information in one or more forms follows. For purposes of explanation, numerous specific details are set forth in order to provide a thorough understanding of the invention. It will be apparent, however, to one skilled in the art that the embodiments can be practiced without these specific details. In other instances, structures and devices are shown in block diagram form in order to avoid obscuring the invention. For example, the invention is described in one embodiment below with reference to user devices such as a smart phone and particular software and hardware. However, the description applies to any type of computing device that can receive data and commands, and any peripheral devices providing services.

Reference in the specification to "one embodiment" or "an embodiment" means that a particular feature, structure, or characteristic described in connection with the embodiment is included in at least one embodiment. The appearances of the phrase "in one embodiment" in various places in the specification are not necessarily all referring to the same embodiment.

Some portions of the detailed descriptions that follow are presented in terms of algorithms and symbolic representations of operations on data bits within a computer memory. These algorithmic descriptions and representations are the means used by those skilled in the data processing arts to most effectively convey the substance of their work to others skilled in the art. An algorithm is here, and generally, conceived to be a self-consistent sequence of steps leading to a desired result. The steps are those requiring physical manipulations of physical quantities. Usually, though not necessarily, these quantities take the form of electrical or magnetic signals capable of being stored, transferred, combined, compared, and otherwise manipulated. It has proven convenient at times, principally for reasons of common usage, to refer to these signals as bits, values, elements, symbols, characters, terms, numbers or the like.

It should be borne in mind, however, that all of these and similar terms are to be associated with the appropriate physical quantities and are merely convenient labels applied to these quantities. Unless specifically stated otherwise as apparent from the following discussion, it is appreciated that throughout the description, discussions utilizing terms such as "processing" or "computing" or "calculating" or "determining" or "displaying" or the like, refer to the action and processes of a computer system, or similar electronic computing device, that manipulates and transforms data represented as physical (electronic) quantities within the computer system's registers and memories into other data similarly represented as physical quantities within the computer system memories or registers or other such information storage, transmission or display devices.

The invention also relates to an apparatus for performing the operations herein. This apparatus may be specially constructed for the required purposes, or it may comprise a general-purpose computer selectively activated or reconfigured by a computer program stored in the computer. Such a computer program may be stored in a computer readable storage medium, such as, but is not limited to, any type of disk including floppy disks, optical disks, CD-ROMs, and magnetic disks, read-only memories (ROMs), random access memories (RAMs), EPROMs, EEPROMs, magnetic or optical cards, flash memories including USB keys with non-volatile memory or any type of media suitable for storing electronic instructions, each coupled to a computer system bus.

Some embodiments can take the form of an entirely hardware embodiment, an entirely software embodiment or an embodiment containing both hardware and software elements. A preferred embodiment is implemented in software, which includes but is not limited to firmware, resident software, microcode, etc.

Furthermore, some embodiments can take the form of a computer program product accessible from a computer-usable or computer-readable medium providing program code for use by or in connection with a computer or any instruction execution system. For the purposes of this invention, a computer-usable or computer readable medium can be any apparatus that can contain, store, communicate, propagate, or transport the program for use by or in connection with the instruction execution system, apparatus, or device.

A data processing system suitable for storing and/or executing program code will include at least one processor coupled directly or indirectly to memory elements through a system bus. The memory elements can include local memory employed during actual execution of the program code, bulk storage, and cache memories which provide temporary storage of at least some program code in order to reduce the number of times code must be retrieved from bulk storage during execution. Input/output or I/O devices (including but not limited to keyboards, displays, pointing devices, etc.) can be coupled to the system either directly or through intervening I/O controllers.

Network adapters may also be coupled to the system to enable the data processing system to become coupled to other data processing systems or remote printers or storage devices through intervening private or public networks. Modems, cable modem and Ethernet cards are just a few of the currently available types of network adapters.

Finally, the algorithms and displays presented herein are not inherently related to any particular computer or other apparatus. Various general-purpose systems may be used with programs in accordance with the teachings herein, or it may prove convenient to construct more specialized apparatus to perform the required method steps. The required structure for a variety of these systems will appear from the description below. In addition, the specification is not described with reference to any particular programming language. It will be appreciated that a variety of programming languages may be used to implement the teachings of the various embodiments as described herein.

System Overview

FIG. 1 illustrates a high-level block diagram of a system 100 for creating tables including multiple rows from completed form data. The illustrated embodiment of the system 100 comprises: an image capture device 101, portable computing devices 102*a*-102*n*, user devices 103*a*-103*n*, an electronic writer server 107 and an Image Based Document Management (IBDM) server 106 that are each communicatively coupled to the network 104. In FIG. 1 and the remaining figures, a letter after a reference number, for example, "102*a*" is a reference to the element having that particular reference number. A reference number in the text without a following letter, for example "102," is a general reference to any or all instances of the element bearing that reference number.

The network 104 is a conventional type, wired or wireless, and may have any number of configurations such as a star configuration, token ring configuration or other configurations known to those skilled in the art. Furthermore, the network 104 may comprise a local area network (LAN), a wide area network (WAN) (e.g., the Internet), and/or any other interconnected data path across which multiple devices may communicate. In yet another embodiment, the network 104 may be a peer-to-peer network. The network 104 may also be coupled to or includes portions of a telecommunications network for sending data in a variety of different communication protocols. In yet another embodiment, the network 104 includes Bluetooth communication networks or a cellular communications network for sending and receiving data such as via short messaging service (SMS), multimedia messaging service (MMS), hypertext transfer protocol (HTTP), direct data connection, WAP, email, etc. While only one network 104 is coupled to the plurality of portable computing devices 102*a*-102*n*, the plurality of user devices 103*a*-103*n*, the electronic writer server 107 and the Image Based Document Management (IBDM) server 106, in practice any number of networks 104 can be connected to the entities.

The image capture device 101 is coupled to the network 104 via signal line 111. Although only one image capture device 101 is illustrated, persons of ordinary skill in the art will recognize that any number of image capture devices 101 can be coupled to the network 104. The image capture device 101 is adapted to capture an image of a printed form that includes strokes filled out using, for example a pen, pencil, etc., and send the printed form image to the electronic writer server 107. In one embodiment, the image capture device 101 also sends an unmarked printed form image (i.e., an image of the printed form without any strokes, e.g., a blank form) as metadata along with the captured image to the electronic writer server 107. The image capture device 101 is, for example, a scanner, a digital camera, a standard cellular camera phone, a webcam, a video recorder, etc. Although the image capture device 101 is illustrated as being a separate device from the portable computing device 102, in one embodiment, the portable computing device functions as an image capture device 101.

The portable computing devices 102*a*-102*n* are each wirelessly coupled to the network 104 via signal lines 112*a*-112*n* respectively. The portable computing device 102 is any computing device including a memory, a processor and wireless communication capability. For example, the portable computing device 102 can be a tablet computer, a personal digital assistant, a smart phone, etc. The portable computing device 102 is adapted to receive form images, add stroke annotations to the form images and send the annotated forms to the electronic writer server 107. A form, whether printed or electronic, is any document that includes fields (i.e., blank spaces) for insertion of required or requested information. The form when filled out with the requested information may be a statement, an order, a request, etc. For example, a form can be a tax form, an insurance form, a medical form, an electronic check, a job application, a survey, a receipt, etc.

In one embodiment, the portable computing device 102 is a tablet computer including a computing pad and a stylus. The computing pad is adapted to display a form image and capture any strokes written on the form image using the stylus or a fingertip of the user. The strokes are typically displayed immediately on top of the image, just as if written by pen on paper. The computing pad usually captures the strokes as a sequence of points or segments along with location, timing and pressure information. The computing pad sends the form images including the captured strokes in any image format known to persons of ordinary skill in the art, for example, a scalable vector graphics (SVG) file format, which can contain both strokes and images. In one embodiment, the computing pad attaches the information associated with the strokes, for example, the location, the pressure profiles and timing information with the form images as metadata. The portable computing device 102 determines location information by using global positioning system (GPS) circuitry included within the device itself to determine its location. In one embodiment, the portable computing device 102 accesses a database including pairs of media access control (MAC) addresses and locations over the Internet. To determine a location, the portable computing device 102 only retrieves the location corresponding to the access point MAC address from the database. For determining the portable computing device's 102 location indoors, the portable computing device 102 employs radio frequency, ultra-sound signal or invisible light communication. For example, the portable computing device 102 determines its location through wireless access points based on measuring the intensity of received signals. In one embodiment, the captured strokes are saved in a stroke format known to any person of ordinary skill in the art, including SVG or Ink Markup Language (InkML).

The user devices 103a-103n are each coupled to the network 104 via the signal lines 113a-113n respectively. The user device 103 is any computing device that includes a memory and a processor, for example, a desktop computer, a laptop computer, etc. The user device 103 is adapted to send and receive data to and from the IBDM server 106. For example, the user device 103 sends a request to view a table in the table to the IBDM server 106 and the IBDM server 106 provides data in JSON (JavaScript Object Notation) and PNG (Portable Network Graphics) format to the user device 103. The user device 103 is accessed by users that have permission to access information from the IBDM server 106, such as a creator of the form sent to portable computing devices 102 or an administrator of the IBDM server 106. The user device 103 includes a display for viewing information provided by the IBDM server 106. For example, the user device 103 receives graphical data from the IBDM server 106 for viewing details of multiple forms in a spreadsheet-like table view and/or with dashboard style summaries on the display of the user device 103. In some embodiments, the user device 103 includes software for annotating a form. For example, the software allows the user to identify redundant fields in the form and transmit the annotations to the IBDM server 106 for processing.

The electronic writer server 107 is any computing device including a memory and a processor which is coupled to the network 104 via signal line 109. In one embodiment, the electronic writer server 107 generates one or more types of forms for a user to complete. For example, the electronic writer server 107 may generate forms relating to visitor registration, patient medical history, expense report, vehicle mileage log, bank enrollment, etc. In another embodiment, the electronic writer server 107 receives an unmarked blank form image from the image capture device 101. The electronic writer server 107 comprises software (not shown) that specifies the coordinates of form fields, labels of individual fields and labels of groups of fields in the form image. In one embodiment, the electronic writer server 107 generates a field identifier for each identified field and a label identifier for each identified label in the one or more types of forms. The one or more types of forms are assigned form identifiers. The electronic writer server 107 provides the blank form image and metadata describing the identity and the location of fields, labels, images and/or symbolic text for labels on the blank form image to the IBDM server 106.

In one embodiment, the electronic writer server 107 receives form data for one or more forms that are filled out with handwriting strokes and attached with one or more types of media from the plurality of portable computing devices 102a-102n. The electronic writer server 107 collects the form data, handwriting strokes and media associated with the forms for delivering to the IBDM server 106. Although only one electronic writer server 107 is illustrated, persons with ordinary skill in the art will recognize that any number of electronic writer servers 107 can be coupled to the network 104.

The IBDM server 106 is any computing device including a memory and a processor which is coupled to the network 104 via signal line 116. The IBDM server 106 includes a table creation module 108. The table creation module 108 is described in further detail below with reference to FIG. 2. In one embodiment, the table creation module 108 receives completed form data, generates field images from the completed form data, determines a set of unique field images, redundant fields and associated fields in the completed form data, populates a first row of the table in a first column with a first unique field image, adds remaining field images from the set of unique field images to the first row, populates the first row with a first redundant field image and remaining field images from a first set of associated fields, determines whether a next redundant field image is a part of a next set of associated fields redundant with the first set, adds the next set of associated fields to same columns as the first set in the next row responsive to determining that the next redundant field image is a part of the next set and adds the first unique field image in the first column of the next row and the remaining field image from the set of unique field images to the next row. Although only one IBDM server 106 is illustrated, persons with ordinary skill in the art will recognize that any number of IBDM servers 106 can be coupled to the network 104. The IBDM server 106 is described in further detail below with reference to FIG. 2.

Table Creation Module 108

Figure 2:
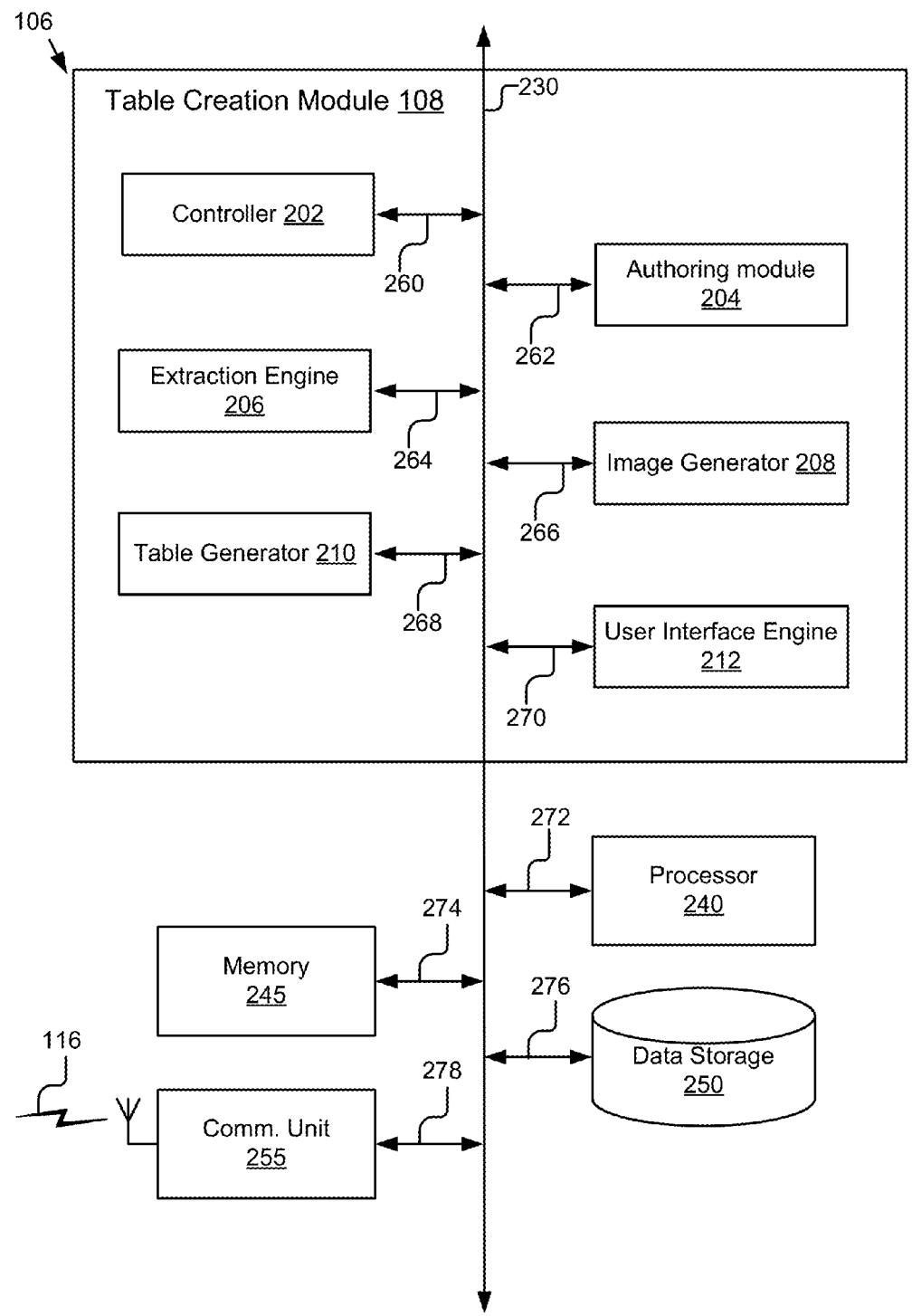
FIG. 2 is a block diagram illustrating one embodiment of an Image Based Document Management (IBDM) server in more detail.

Referring now to FIG. 2, the table creation module 108 is shown in more detail. FIG. 2 is a block diagram of the Image Based Document Management (IBDM) server 106 that includes a processor 240, a memory 245, a communication unit 255, data storage 250 and the table creation module 108.

The processor 240, the memory 245, the communication unit 255 and the data storage 250 are communicatively coupled to the bus 230. The bus 230 may represent one or more buses including an industry standard architecture (ISA) bus, a peripheral component interconnect (PCI) bus, a universal serial bus (USB), or some other bus known in the art to provide similar functionality.

The processor 240 comprises an arithmetic logic unit, a microprocessor, a general purpose controller or some other processor array to perform computations. The processor 240 is coupled to the bus 230 for communication with the other components of the IBDM server 106 via signal line 272. The processor 240 processes data signals and may comprise various computing architectures including a complex instruction set computer (CISC) architecture, a reduced instruction set computer (RISC) architecture, or an architecture implementing a combination of instruction sets. Although only a single processor is shown in FIG. 2, multiple processors may be included. The processing capability may be limited to supporting the display of images and the capture and transmission of images. The processing capability might be enough to perform more complex tasks, including various types of feature extraction and sampling. It will be obvious to one skilled in the art that other processors, operating systems, sensors, displays and physical configurations are possible.

The memory 245 stores instructions and/or data that may be executed by processor 240. The memory 245 is coupled to the bus 230 for communication with the other components of the IBDM server 106 via signal line 274. The instructions and/or data may comprise code for performing any and/or all of the techniques described herein. The memory 245 may be a dynamic random access memory (DRAM) device, a static random access memory (SRAM) device, flash memory or some other memory device known in the art. In one embodiment, the memory 245 also includes a non-volatile memory or similar permanent storage device and media such as a hard disk drive, a floppy disk drive, a CD-ROM device, a DVD-ROM device, a DVD-RAM device, a DVD-RW device, a flash memory device, or some other mass storage device known in the art for storing information on a more permanent basis.

The communication unit 255 is hardware for receiving and transmitting data by linking the processor 240 to the network 104 and other processing systems. The communication unit 255 receives data such as requests from the user device 103 and transmits the requests to the table generator 210, for example a request for viewing a table. The communication unit 255 also receives information, such as completed form data, from the electronic writer server 107. The communication unit 255 transmits information including table to the user device 103 for display, for example, in response to a request. The communication unit 255 is coupled to the bus 230 via signal line 278. In one embodiment, the communication unit 255 includes a port for direct physical connection to the user device 103, the portable computing device 102 or to another communication channel. For example, the communication unit 255 includes an RJ45 port or similar port for wired communication with the user device 103. In another embodiment, the communication unit 255 includes a wireless transceiver 116 for exchanging data with the user device 103, the portable computing device 102 or any other communication channel using one or more wireless communication methods, such as IEEE 802.11, IEEE 802.16, Bluetooth® or another suitable wireless communication method.

In yet another embodiment, the communication unit 255 includes a cellular communications transceiver for sending and receiving data over a cellular communications network such as via short messaging service (SMS), multimedia messaging service (MMS), hypertext transfer protocol (HTTP), direct data connection, WAP, e-mail or another suitable type of electronic communication. In still another embodiment, the communication unit 255 includes a wired port and a wireless transceiver. The communication unit 255 also provides other conventional connections to the network 104 for distribution of files and/or media objects using standard network protocols such as TCP/IP, HTTP, HTTPS and SMTP as will be understood to those skilled in the art.

The data storage 250 is a non-transitory memory that stores information associated with a plurality of forms received from the electronic writer server 107. The data storage 250 is coupled to the bus 230 for communication with the other components via signal line 276. In one embodiment, the data storage 250 receives information from the electronic writer server 107 to store a blank form image and metadata describing the identity and the location of fields, labels, images and/or symbolic text for labels on the blank form image that corresponds to the completed form data. In one embodiment, the data storage 250 receives information associated with the redundant fields and sets of associated fields in the blank form image from the authoring module 204. In one embodiment, the data storage 250 receives information from the extraction engine 206 that includes extracted information (e.g., drawing primitives, transform, line and file color) and metadata associated with media fields and symbolic fields. In another embodiment, the data storage 250 stores the handwriting stroke data in a compressed format, such as, InkML, SVG, etc. received from the stroke identification module 206.

In one embodiment, the data storage 250 receives information from the image generator 208 that includes field images of handwriting strokes, symbolic fields and media fields) and metadata associated with the field images including stroke metadata for recreating strokes as field images, a form identifier, a field identifier etc. The metadata also includes stroke information including a date and time that each stroke was input and the location of each stroke. Lastly, the metadata includes symbolic representation information associated with the field images that are subjected to optical character recognition (OCR), optical mark recognition (OMR), intelligent character recognition (ICR), handwriting recognition, pattern recognition, etc. The metadata is used in the generation of a table, as will be described in more detail below.

In one embodiment, the table creation module 108 comprises a controller 202, an authoring tool module 204, an extraction engine 206, an image generator 208, a table generator 210 and a user interface engine 212.

The controller 202 is software and routines for receiving data via the communication unit 255, routing the data to the appropriate engine or module and transmitting responses from modules or engines to the communication unit 255 for transmitting to the user device 103 and other components of the system 100. In one embodiment, the controller 202 is a set of instructions executable by the processor 240 to provide the functionality described below for managing data transfer between the components of the IBDM server 106 and other components of the system 100. In another embodiment, the controller 202 is stored in the memory 245 and is accessible and executable by the processor 240. In either embodiment, the controller 202 is adapted for cooperation and communication with the processor 240, the communication unit 255, the authoring module 204, the extraction engine 206, the image generator 208, the table generator 210, the user interface engine 212 and other components of the IBDM server 106 via signal line 260.

The authoring module 204 is software and routines for identifying fields on a blank form image that incorporate the same type of information. In one embodiment, the authoring module 204 is a set of instructions executable by the processor 240 to provide the functionality described below for identifying redundant fields on a blank form image. In another embodiment, the authoring module 204 is stored in the memory 245 and is accessible and executable by the processor 240. In either embodiment, the authoring module 204 is adapted for cooperation and communication with the controller 202, the image generator 208, the table generator 210, the data storage 250 and other components of the IBDM server 106 via signal line 262.

In one embodiment, the authoring module 204 receives a blank form image from the electronic writer server 107. The authoring module 204 receives annotations from the user device 103 that identify fields on the blank form image. For example, the authoring module 204 receives fields on the blank form image highlighted by colored boxes and the authoring module 204 numbers the highlighted fields in an appropriate order. In one embodiment, the authoring module 204 receives a selection of one or more fields from the user device 103 and identifies the fields as redundant fields. For example, one or more fields store the same information or the same type of information on a form image, such as a list of purchases (e.g., business lunch, San Jose flight ticket, etc.) on an expense report or a list of health conditions (e.g., asthma, diabetes, etc.) on a patient medical history. In another embodiment, the authoring module 204 determines one or more fields sharing a common label on the form, and the authoring module 204 identifies the fields associated with the common label as being redundant with each other. For example, on a form for a vehicle mileage log, a label "Destination" can include a number of fields vertically under it and the authoring module 204 identifies the fields as redundant.

In another embodiment, the authoring module 204 receives a selection of redundant fields where each redundant field is storing information of a different type. The authoring module 204 groups the selected redundant fields together as a set of associated fields. Referring now to FIG. 3, a graphic representation of a user interface 300 where an example form received by the IBDM server 106 is illustrated. In the illustrated example, the label "Expense Category" 301, the label "Descriptions" 303 and the label "Amount" 305 characterize a first table in the form. In another example, the label "Destination" 315, the label "Miles" 317 and the label "Amount" 319 characterize a second table in the form.

In one embodiment, the authoring module 204 receives a selection of redundant fields $A_1$ 307 (redundant with $A_2$, $A_3$, etc.), $B_1$ 309 (redundant with $B_2$, $B_3$, etc.) and $C_1$ 311 (redundant with $C_2$, $C_3$, etc.) (illustrated with small dashes) under the label "Expense Category" 301, the label "Descriptions" 303 and the label "Amount" 305 in the form. The authoring module 204 groups horizontally the selected redundant fields as a set of associated fields 313 (illustrated with longer dashes). In another embodiment, the authoring module 204 groups one set of associated fields as being redundant with another set of associated fields in the table of the form. For example, in the graphic representation of FIG. 3, the authoring module 204 groups a second set of associated fields ($A_2$, $B_2$, $C_2$), a third set of associated fields ($A_3$, $B_3$, $C_3$) and a fourth set of associated fields ($A_4$, $B_4$, $C_4$) as being redundant with each other in addition to being redundant with the first set of associated fields 313 ($A_1$, $B_1$, $C_1$) in the first table 321.

In another example, in the graphic representation of FIG. 3, the authoring module 204 groups a first set of associated fields ($D_1$, $E_1$, $F_1$) as being redundant with a second set of associated fields ($D_2$, $E_2$, $F_2$) in the second table 323.

In one embodiment, the authoring module 204 stores information associated with the redundant fields and sets of associated fields on the blank form image in the data storage 250. In another embodiment, the authoring module 204 transmits the information associated with the redundant fields and sets of associated fields to the table generator 208 as metadata associated with the blank form image.

The extraction engine 206 is software and routines for extracting information associated with fields in one or more completed forms received from the electronic writer server 107. In one embodiment, the extraction engine 206 is a set of instructions executable by the processor 240 to provide the functionality described below for extracting information associated with fields from completed form data. In another embodiment, the extraction engine 206 is stored in the memory 245 and is accessible and executable by the processor 240. In either embodiment, the extraction engine 206 is adapted for cooperation and communication with the controller 202, the image generator 208, the data storage 250 and other components of the IBDM server 106 via signal line 264.

In one embodiment, the extraction engine 206 extracts a background image from one or more completed forms received from the electronic writer server 107 through the controller 202. The background image is used to identify a blank form that corresponds to the one or more completed forms. In another embodiment, the background image is used to identify a "collection" of forms to add the one or more completed forms for purposes of organization. For example, an employee may fill out an "Expense Report" form and that form is added to a collection of expense forms in the data storage 250. In another example, a depot manager may fill out a "Vehicle Mileage Log" and that form is added to a collection of vehicle logs in the data storage 250.

The completed form data for one or more forms include handwriting fields, symbolic fields and media fields. The handwriting fields include handwriting data, for example, writing, drawing and/or marking with strokes by a user. The symbolic fields include a graphical representation, for example, instructions for drawing a check box (e.g. drawing primitives, transforms, line and fill color, bitmaps) and include symbolic data, for example, a symbolic representation of a choice (e.g., a text phrase, such as, "True", "False", etc. beside a check box), timestamp metadata associated with the form (time and/or original date of fill out), timestamp metadata for stroke input (e.g., first stroke input time, median stroke input time, last stroke input time, etc.), location metadata where the form was submitted, etc. A symbolic field for choosing a product in one example has a graphical representation that is an image of the product and a symbolic value that is the model number for the product. A symbolic field in another example has a graphical representation that uses icons, logos or cartoons. The media fields include media data captured by a portable computing device 102 or media data saved on the storage of the portable computing device 102 that is used in the form, for example, a photograph, an icon that is linked to audio or video recording, etc. In one embodiment, the handwriting fields and the media fields can both appear at the same location on the completed form. For example, a user may mark strokes on top of a photograph, such as, a flight ticket stub attached to the completed form.

Referring to the symbolic fields in the one or more completed forms, the extraction engine 206 in one embodiment extracts a line and fill color, a drawing primitive (for e.g., a square checkbox, a rectangular box for receiving handwriting strokes, "X" mark, ellipse, dotted line, etc.) and a transform used for drawing a graphical representation associated with the symbolic fields. In another embodiment, the extraction engine 206 extracts a symbolic value associated with the symbolic fields. For example, a text phrase indicating a choice beside a radio button, an email address entered by a user with a soft keyboard on a tablet into a text field, etc. In yet another embodiment, the extraction engine 206 extracts the timestamp and location associated with the form. For example, the date of when the form was filled out, the location of where the form was filled out, a time of stroke input in the fields, etc. In one embodiment, the extraction engine 206 sends the extracted information from the symbolic fields to the image generator 208. In another embodiment, the extraction engine 206 stores the extracted information in the data storage 250. The information extracted is stored in a structured and serialized data format known to any person of ordinary skill in the art, including JavaScript Object Notation (JSON).

Referring to the media fields in the one or more completed form, the extraction engine 206 in one embodiment extracts a transform used for drawing the graphical representation and a drawing primitive associated with the media fields. For example, the drawing primitive of the media fields can be the transform or geometric shape (e.g., coordinates of a rectangle) defining where a media, such as, a photograph is placed. The other types of media extracted as a drawing primitive include an icon that is associated with an audio or video recording, a thumbnail, etc. In one embodiment, the extraction engine 206 sends the extracted information from the media fields to the image generator 208. In one embodiment, the extraction engine 206 stores the extracted information in the data storage 250. In one embodiment, the extraction engine 206 uses the completed form data that corresponds to the completed forms to extract the line and fill color, the drawing primitive and the transform used for drawing the graphical representation, etc. from the symbolic fields and the media fields.

In one embodiment, the extraction engine 206 identifies strokes associated with fields in the completed form data and extracts information used for drawing a graphical representation associated with handwriting fields. The extraction engine 206 identifies pixels in a form that represent handwriting strokes based on, for example, the pixel intensities, the color of the pixels, etc. The extraction engine 206 also determines the position (for example, an x-y coordinate) of a stroke in the form. The extraction engine 206 identifies the handwriting strokes for a field by a field identifier. In one embodiment, the extraction engine 206 receives metadata along with the received form that includes position information of the handwriting strokes in the form. The extraction engine 206 identifies the position of each stroke in the form based on the metadata.

The received form data also includes an unmarked blank form image (i.e., an image of the form without any strokes) as metadata. In one embodiment, the extraction engine 206 generates completed form data for each completed form from an input completed form image by, for example, subtracting the input completed form image with the unmarked blank form image. The extraction engine 206 then identifies the position of each stroke within the completed form data and compares it to the known location of the fields in the form.

Referring now to FIG. 4, a graphic representation of a form 400 received by the extraction engine 206 is illustrated. In the illustrated example, the form 400 includes handwriting strokes filled out on the form 400 by a user using the portable computing device 102. The extraction engine 206 identifies the strokes, (for example, the strokes that form the letters S 413, L 415, etc.) from the form 400 and the position of each stroke in the form 400.

In one embodiment, the extraction engine 206 then generates a stroke bounding box for a set of handwriting strokes in completed form data. In one embodiment, the extraction engine 206 identifies handwriting strokes that overlap with each other in the form based on the position of the strokes and generates the stroke bounding box. Each stroke bounding box should be unique and not overlap much with other stroke bounding boxes. The extraction engine 206 generates the stroke bounding box based on the distance between the strokes in the form. In this embodiment, the distance between the positions of each stroke is within a threshold distance. For example, the threshold distance is a few millimeters between characters.

In one embodiment, the extraction engine 206 generates a stroke bounding box for a set of handwriting strokes with x-y coordinates that is relative to the form on which the set of handwriting strokes are marked. For example, the stroke bounding box is generated including an x-y offset from the upper left corner of the form to the upper left corner of the stroke bounding box. In another embodiment, the extraction engine 206 determines a set of handwriting strokes based on their overlap of or proximity to a field (e.g. blank space) in the blank form image. In yet another embodiment, the extraction engine 206 determines a set of handwriting strokes based on the timing information of the strokes received as metadata with a completed form data. For example, the extraction engine 206 generates a stroke bounding box for a set of handwriting strokes that were filled out at the same time.

In one embodiment, the extraction engine 206 sends the extracted information of the stroke bounding boxes to the image generator 208. In another embodiment, the extraction engine 206 stores the extracted information of the stroke bounding boxes in the data storage 250. The information is stored in a stroke format known to any person of ordinary skill in the art, including Scalable Vector Graphics (SVG) or Ink Markup Language (InkML).

The image generator 208 is software and routines for generating field images from handwriting fields, symbolic fields and media fields in completed form data received from the electronic writer server 107. In one embodiment, the image generator 208 is a set of instructions executable by the processor 240 to provide the functionality described below for generating field images from each completed form. In another embodiment, the image generator 208 is stored in the memory 245 and is accessible and executable by the processor 240. In either embodiment, the image generator 208 is adapted for cooperation and communication with the controller 202, the table generator 210, the data storage 250 and other components of the IBDM server 106 via signal line 266.

The image generator 208 receives information associated with the fields of the completed form data that is extracted by the extraction engine 206. In one embodiment, the image generator 208 retrieves the information associated with the fields from the data storage 250. The image generator 208 generates field images based on the information extracted from a combination of handwriting fields, symbolic fields and media fields in the form. In one embodiment, the image generator 208 generates a field image for symbolic fields based on a drawing primitive saved by the extraction engine 206. The drawing primitive that is drawn represents the graphical representation associated with the symbolic fields and any change in the symbolic fields induced by user action (e.g., checking or unchecking a checkbox). The image generator 208 generates, for example, a checked square checkbox, a selected circular radio button, a rectangular name field, ellipse, etc. as field images. In another embodiment, the image generator 208 generates a field image for media fields by rendering media extracted as a drawing primitive by the extraction engine 206. The drawing primitive is used to render the media for creating field images. The image generator 208 renders, for example, a photograph of a vehicle, a photograph of a flight ticket stub, a link to an audio clip of a meeting, etc. as field images. In yet another embodiment, the image generator 208 generates a field image for handwriting fields by rendering handwriting strokes saved as vector data by the extraction engine 206. The vector data including color, width and pressure information is used to render the handwriting strokes as field images. The image generator 208, for example, renders a handwritten signature of a user signed using a stylus into field images.

In one embodiment, the image generator 208 generates field images for both the handwriting fields and the media fields appearing at the same location on the forms. The image generator 208 generates the field image in such instances by rendering the media first and then rendering the handwriting strokes on top of the media. The image generator 208, for example, renders a photograph of a flight ticket stub first and then any handwriting strokes marked on top of the photograph of the flight ticket stub as a field image.

In one embodiment, the image generator 208 generates field images by generating an overlay of completed form data, identifying a group of strokes in each form, identifying a size and a position of a stroke bounding box that encompasses the group of strokes and generating a field image from each of the groups. In another embodiment, the image generator 208 crops the field image from the form based on the size and the position of the bounding box. The image generator 208 generates label images by receiving a field image and the form image associated with the field image, analyzing an area around the field image in the form image to determine a group of related pixels, identifying the group of related pixels as the label for the field image and cropping a label image from an unmarked form image. The process is repeated for all the form images received from the electronic writer server 107. These examples assume that there is only one field and one label in the form image. Persons of ordinary skill in the art will recognize that the process applies to any number of fields and labels in the form image. The image generator 208 transmits the field images and the label images, along with any metadata, to the table generator 210. In one embodiment, the image generator 208 stores the field images and the label images, along with any metadata, in data storage 250. In another embodiment, the image generator 208 stores the field images in one or more formats known to any person of ordinary skill in the art, including Scalable Vector Graphics (SVG), Portable Network Graphics (PNG), etc. Field images may have transparent backgrounds (e.g. black or colored strokes on a transparent background for handwriting strokes). The table generator 210 is software and routines for generating a table associated with the completed form data. In one embodiment, the table generator 210 is a set of instructions executable by the processor 240 to provide the functionality described below for generating the table. In another embodiment, the table generator 210 is stored in the memory 245 and is accessible and executable by the processor 240. In either embodiment, the table generator 210 is adapted for cooperation and communication with the processor 240, the image generator 208, the authoring module 204, the user interface engine 212 and other components of the IBDM server 106 via signal line 268.

In one embodiment, the table generator 210 receives a request from a user via the controller 202 to create a table from the completed form data. In one embodiment, the table generator 210 receives the field images and optionally label images from the image generator 208 or retrieves the field images and label images from data storage 250 for the purpose of generating a table. In one embodiment, the table generator 210 automatically generates a table by first designating a label image as a column header of the table. In another embodiment, if other label images from the same form are available, the other label images are designated as column headers as well. The table generator 210 then populates the column with field images (unique or redundant field images) that are associated with the label image according to the field identifier associated with each field (and consequently associated with each field image). In the table generated by the table generator 210, information from each completed form data corresponds to one or more rows of the table and each column includes a field image from a particular field (e.g. a particular blank space on the blank form).

In one embodiment, the table generator 210 determines a set of field images that are unique (non-redundant) in the field images received by the table generator 210 for the completed forms. For example, the field images that are unique and non-redundant in a completed form includes information about the user filling up the form, such as, name, date, email address, signature, etc. In one embodiment, the table generator 210 generates the table by entering the unique field images from a first form to the first row of the table under related label images designated as column headers. In one embodiment, the table generator 210 determines field images that are associated with redundant fields and sets of associated fields identified on a blank form by the authoring module 204. For example, in the expense report form 300 in FIG. 3, redundant fields include fields storing the same type of information, such as fields under the "Amount" field label and a set of associated fields include a set of redundant fields, each redundant field storing information of a different type, such as, "Expense category", "Description" and "Amount."

In one embodiment, the table generator 210 determines a first set of associated fields filled on the first form and populates the first row of the table with redundant field images from the first set of associated fields. The table generator 210 generates rows of the table based on the sets of associated fields identified and determined to be redundant with each other in the completed form. In one embodiment, the table generator 210 generates an additional row in the table for every set of associated fields following the first set of associated fields that are redundant with the first set on the first form. Each additional row is populated with redundant field images from each set of associated fields following the first set of associated fields. The redundant field images are populated under label images related to the first set of associated fields designated as column headers. For example, if the first form in FIG. 3 has a list of two expenses filled, such as expenses associated with Travel and Consultant fees, in the set of associated fields $(A_1, B_1, C_1)$ and $(A_2, B_2, C_2)$, the table generator 210 generates two rows for the first form in the table and populates the two rows with the field images from the set of associated fields $(A_1, B_1, C_1)$ and $(A_2, B_2, C_2)$.

In one embodiment, the table generator 210 determines a second set of associated fields filled on the first form and every set of associated fields following the second set of associated fields. The table generator 210 generates an additional row in the table for the second set of associated fields and for every set of associated fields following the second set of associated fields. In one embodiment, the table generator 210 generates a next column header based on label images related to the second set of associated fields. The table generator 210 determines whether the second set of associated fields and each set of associated fields following the second set are filled. The redundant field images of the second set of associated fields and of each set of associated fields following the second set of associated fields are added to the next column headers on each additional row generated for the table. For example, if the form in FIG. 3 has a list of two mileage entries filled, such as, mileages associated with traveling to the San Jose Airport and the Little America Hotel, in the associated fields ($D_1$, $E_1$, $F_1$) and ($D_2$, $E_2$, $F_2$), the table generator 210 generates the next three columns (using the labels of associated fields ($D_1$, $E_1$, $F_1$)) and two additional rows in the table for first form. The field images from the associated fields ($D_1$, $E_1$, $F_1$) and ($D_2$, $E_2$, $F_2$) are populated under the next three columns on the two additional rows in the table. In addition, the determined set of unique field images are common to every additional row generated in the table for the first form. In one embodiment, the table generator 210 includes the set of unique field images in the additional rows added in the table for the first form.

In one embodiment, the order of the field images under the column headers are determined based on the form identifier associated with the field images. For example, a form identifier associated with a field image can indicate the time entry (time of fill-out) or date of submission associated with the form that is earlier than another field image in another form and so the field images are arranged with the first field image appearing above the second field image.

The table generator 210 generates a table that comprises columns organized in different ways. In one embodiment, the label images are placed according to their location in the form so that the first field in the form appears before the second field, etc. This is referred to as a reading order. In another embodiment, the table generator 210 places columns that include field images containing unique numbers before other field images. For example, the table generator 210 places field images of user identification numbers (e.g., medical record number, vehicle license, etc.), for the users of the portable computing devices 102 as the first column because it can be used to uniquely identify the user.

In one embodiment, the table generator 210 identifies metadata associated with the form images as symbolic fields and incorporates the field images of such metadata into at least one additional column. For example, the table generator 210 identifies the field images generated by the image generator 208 associated with a timestamp of when the form was filled out or a GPS location where the form was filled out and adds two columns to the table. In another example, the table generator 210 adds a column for timestamp metadata associated with a first stroke input, a last stroke input, etc. on the form images. In one embodiment, the table generator 210 associates the completed form images with the table and instructs the user interface engine 212 to generate a pop-up with the completed form image in response to a user hovering over a field image in a row of the table. The completed form image corresponds to one or more rows of the table. In another embodiment, the pop-up is provided to the user in response to the user selecting a row in the table. In some embodiments, the completed form image is created by drawing field images on top of a blank form image. The table generator 210 generates a modified table in response to receiving a request from a user device 103 through the user interface engine 212, which is discusses in greater detail below.

In one embodiment, the table generator 210 receives a request from the user device 103 via the controller 202 to filter the table by one or more columns of the table. In one embodiment, the request is received to filter the table by selecting a field image under at least one column header of the table as being representative of how the table is to be filtered. For example, the user selects a field image of an expense with strokes, such as "Travel" under a column associated with a "Expense Category" field label and requests that the table generator 210 filter the rows of the table and return the table only with the rows representing field images that contain strokes "Travel" associated with the "Expense Category" field label. In another embodiment, a request is received to filter the table by selecting a field image including media under another column header of the table as being representative of how the table is to be filtered. For example, the user selects a field image including a photograph (e.g., flight ticket stub, medical record, etc.) under a column associated with a "Photo" label image and requests the table generator 210 to filter the rows of the table and return the table only with the rows representing field images including the photographs associated with "Photo" label image. In yet another embodiment, the request is received to filter the table by selecting the field image of strokes under the at least one column header and the field image of symbolic data under the at least one other column header as being representative of how the table is to be filtered. For example, the user selects the field image of an expense with strokes, such as "Travel" under the column associated with "Expense Category" label image and selects the field image of symbolic data, such as "Engineering" under the column associated with "Dept" label image and requests the table generator 210 to filter the rows of the table and return the table only with rows including field images that contain strokes "Travel" associated with "Expense Category" label image and field images with "Engineering" symbolic data associated with "Dept" label image.

In another embodiment, the table generator 210 receives a request to sort at least one row of the table by at least one column from the user device 103 via the controller 202. In one embodiment, the field images in the at least one column are converted to symbolic representations. The symbolic representations includes symbolic information generated (for example, machine encoded text such as universal character set transformation format-8-bit (UTF-8) for the field or label image using, for example, Optical Character Recognition (OCR), Optical Mark Recognition (OMR), intelligent character recognition (ICR), handwriting recognition, pattern recognition, interaction with a Human-in-the-loop (HITL) system, etc. The table generator 210 accesses the metadata including symbolic information associated with the symbolic representations of content in the at least one column and sorts the at least one row of the table by the at least one column. For example, the user may request to sort the table by the column "Name" in the table and return the table sorted either in ascending order, descending order or by a number of characters in the "Name" fields.

The user interface engine 212 is software including routines for generating graphical data for displaying a user interface that includes a table generated from form images. In one embodiment, the user interface engine 212 is a set of instructions executable by the processor 240 to generate the user interface. In another embodiment, the user interface engine 212 is stored in the memory 245 and is accessible and executable by the processor 240. In either embodiment, the user interface engine 212 is adapted for cooperation and communication with the processor 240 and other components of the IBDM server 106 via signal line 270.

In one embodiment, responsive to a user of a user device 103 requesting the user interface, the user interface engine 212 retrieves the table from the table generator 210 or from data storage 250 and generates graphical data for displaying the table. For example, the graphical data could include JSON descriptions and PNG images for the user device 103 to render the table. The user interface engine 212 arranges the multiple rows generated for redundant fields and a set of associated fields determined in one or more forms and columns to represent the field images (unique and redundant field images).

In one embodiment, the table is further modified according to user requests received from the user device 103 via the controller 202. The table generator 210 then queries the data storage 250 using the user requests and the table generator 210 recreates the table accordingly with the results obtained from the data storage 250. The table generator 210 instructs the user interface engine 212 to generate graphical data for displaying the recreated table. In one embodiment, the process of recreating the table is based on symbolic information or handwriting stokes associated with the table. Those skilled in the art will recognize that any number of requests may be received for modifying the table by the IBDM server 106, such as, sorting, searching, filtering and grouping the field images in the rows of the table. The following modification processes are provided by way of example and not by way of limitation as processes that the IBDM server 106 may implement. Furthermore, each of the requests may be combined with others for increased functionality.

Example User Interfaces

Turning now to FIG. 3, a graphic representation of an embodiment of a user interface 300 that includes highlighting redundant fields and set of associated fields on the form image is illustrated. The user interface 300 includes a label "Expense Category" 301, a label "Descriptions" 303 and a label "Amount" 305 in a first table 321 of the form image. Each label includes a list of four fields under it. Under the identified labels, the four fields listed $A_1$ through $A_4$, $B_1$ through $B_4$ and $C_1$ through $C_4$ are redundant with each other because they store the same type of data. For example, the "Expense Category" 301 identifies types of expenses related to travel, consultant fees, etc. in the fields $A_1$ through $A_4$. The user interface 300 also includes another set of labels, such as, "Destination" 315, "Miles" 317 and "Amount" 319 in a second table 323 and each label in this set has a list of two fields under it. The two fields listed $D_1$ through $D_2$, $E_1$ through $E_2$ and $F_1$ through $F_2$ are also redundant with each other. In one embodiment, the fields $A_1$ to $A_4$, $B_1$ to $B_4$ and $C_1$ to $C_4$ are each individually identified as redundant fields using an authoring tool. In addition, the redundant fields including field $A_1$ 307, field $B_1$ 309 and field $C_1$ 311 are then grouped as a set 313 of associated fields. In this graphic representation, a redundant field is illustrated with small dashes and a set of associated fields is illustrated with longer dashes. Although only one set 313 of associated fields is illustrated in the graphic representation, persons of ordinary skill in the art will recognize that the same procedure can be repeated for fields $(A_2, B_2, C_2)$, $(A_3, B_3, C_3)$, $(A_4, B_4, C_4)$, $(D_1, E_1, F_1)$ and $(D_2, E_2, F_2)$ in the form 300, thereby identifying six sets of associated fields for the form image.

FIG. 4 illustrates an example form 400 that includes a number of fields including a handwriting field 401. A user fills in a field by inputting strokes inside the rectangular boxes (e.g., writing with a stylus). The form 400 also includes a symbolic field 405 that the user can use to select a choice, for example, by tapping on the rectangular region for a drop down list of choices. In one embodiment, the form 400 includes a media field for the user to attach media to the form, for example, a photograph of an expense receipt. In the example form 400, the fields have corresponding labels, such as, Name, Date, Email, Expense Category, etc. The label "Expense Category" 407 has a list 403 of fields associated with it that are of the same type and redundant with each other. For example, a business firm's expenses may be "Travel," "Promotion", "Consultant fees", etc. and fall under the label "Expense Category" 407. Similarly, the label "Description" 409 and the label "Amount" 411 have a list of fields associated with them that are of the same type and redundant with each other.

Figure 5A:
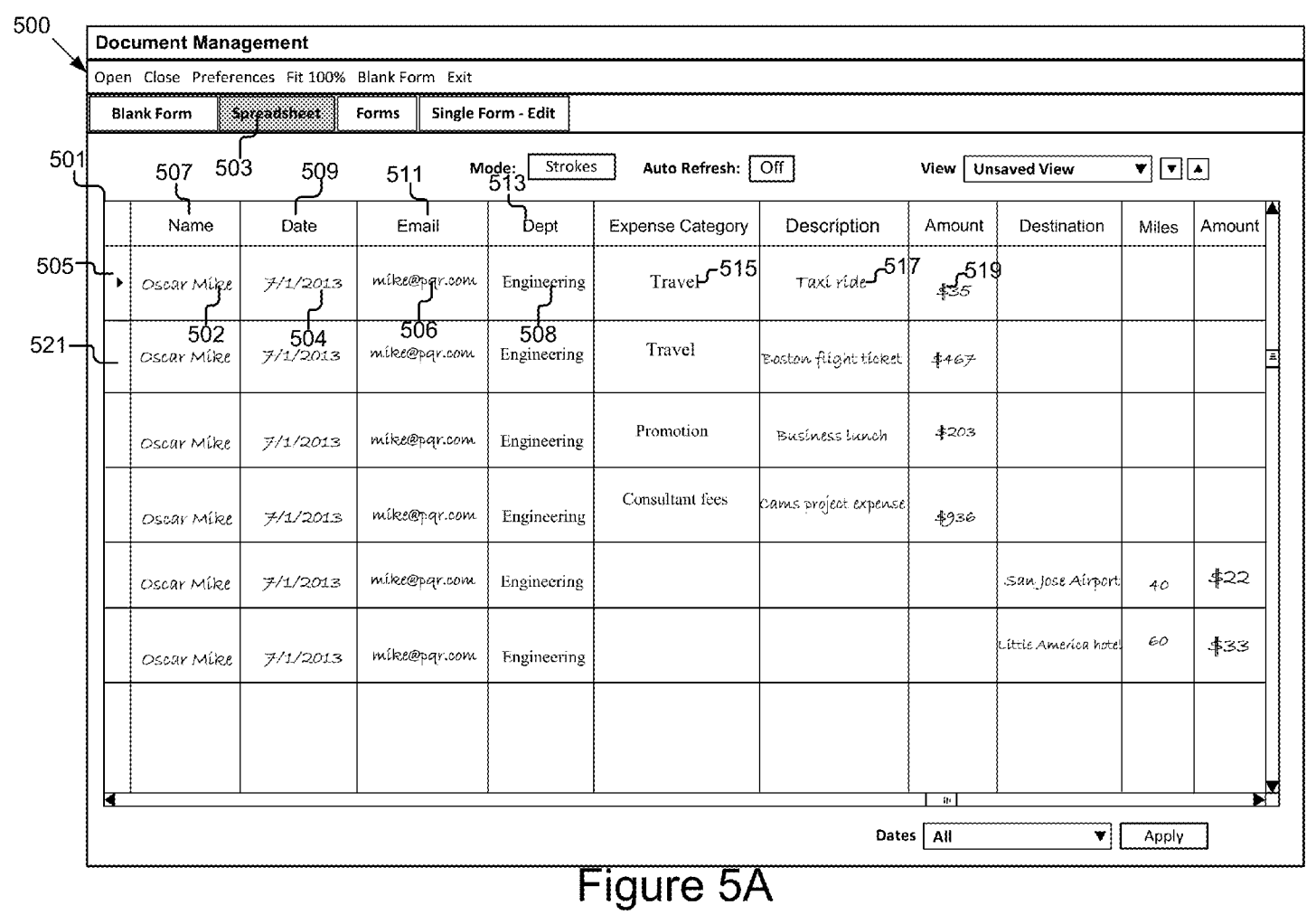

FIG. 5A is a graphic representation of an embodiment of a user interface 500 that displays a table including multiple rows generated for a single form. In this graphic representation, the user interface 500 includes a table 501 that is generated from a form 400 in FIG. 4 received by the Image Based Document Management (IBDM) server 106 and in response to the user clicking on the "Spreadsheet" button 503. The table 501 includes six rows in the table 501 for the form image 400 based on six sets of associated fields filled out in the form 400 by the user "Oscar Mike" 502. The column headers, for example, "Name" 507, "Date" 509, "Email" 511 and "Dept" 513 include field images that are unique in the form 400 but common to each set of associated fields. Each row of the table 501 includes the field images that are common and field images from each set of associated fields. For example, in the table 501, the first row 505 includes the field images "Oscar Mike" 502, "Jul. 1, 2013" 504, "mike@pqr.com" 506 and "Engineering" 508 that are common and field images "Travel" 515, "Taxi ride" 517 and "$35" 519 from the first set in the six sets of associated fields determined for the form 400. The field images from second set in the six sets of associated fields are added to the second row 521 and field images under the column headers "Name" 507, "Date" 509, "Email" 511 and "Dept" 513 are repeated in the second row again. The procedure is repeated by the table generator 210 to generate the remaining rows in the table 501.

FIG. 5B is a graphic representation of an embodiment of a user interface 525 that displays a table including multiple rows generated per form for a plurality of forms. In this graphic representation, the user interface 525 includes the table 501 that is generated from a plurality of forms 400 received by the Image Based Document Management (IBDM) server 106 and in response to the user clicking on the "Spreadsheet" button 503. The table 501 lists a first set 561 of six rows for the six sets of associated fields determined filled out by user "Oscar Mike" 502 in the form 400. Each row of the set 561 of six rows includes unique field images that are common (e.g., Name "Oscar Mike", Date "Jul. 1, 2013, Email "mike@xyz.com", Dept "Engineering", etc.) and field images from the set of associated fields filled out in the form image by user "Oscar Mike" 502. Similarly, the user "Brooke Green" 567 has a second set 563 of two rows in the table 501 for having filled out two sets of associated fields in the form image 400 and the user "Leroy Mckay" 569 has a third set 565 of two rows in the table 501 for having filled out two sets of associated fields in the form image 400.

FIG. 5C is a graphic representation of an embodiment of a user interface 575 that displays a modified table responsive to receiving a request and rearranging the content in the table. In this graphic representation of the user interface 575, the user selects a column "Expense Category" 587 from a drop down menu 581 and specifically selects "Travel" as an expense from another drop down menu 583 to filter the table 501. Upon the user clicking the "Apply" button 585, the table generator 210 updates the table 501 to include only those rows with "Travel" listed as an expense under the column "Expense Category" 587. For example, the user "Oscar Mike" 502 has two expenses listed as "Travel" and the user "Brooke Green" 567 has one expense listed as "Travel" under the column "Expense Category" 587. In one embodiment, the user interface 575 also includes a pop-up window 591 that sums up the entries in the column "Amount" 589 because it is applicable to the column "Expense Category" 587. For example, the sub-total for "Travel" as an expense under the column "Expense Category" 587 is calculated to be $732 in the pop-up window 591.

Methods

Figure 6:
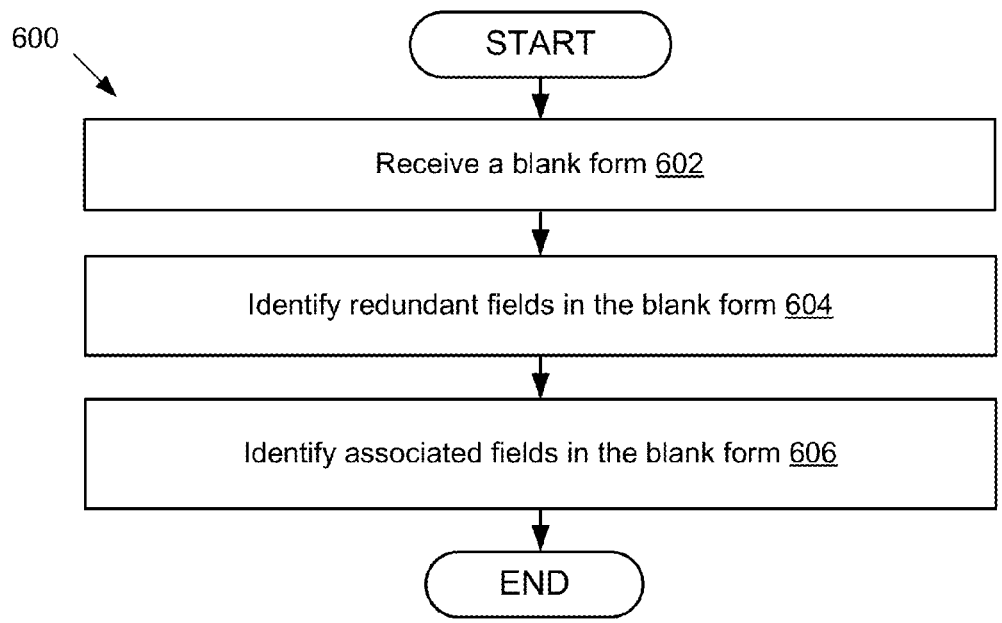
FIG. 6 is a flow diagram of one embodiment of a method for identifying redundant fields and a set of associated fields on a form.

Referring now to FIGS. 6, 7, 8A-8B, various embodiments of the methods of the invention will be described. FIG. 6 is a flow diagram 600 of an embodiment of a method for identifying redundant fields and a set of associated fields on a form. The table creation module 108 includes an authoring module 204. In one embodiment, the authoring module 204 receives 602 a blank form. The blank form is used by people to create to one or more completed forms that are received from the electronic writer server 107. For example, a large multinational business has a large number of employees who fill out an "Expense Report" form, a hospital receives a large number of patients who fill out a "Patient Medical History" form, etc. The authoring module 204 identifies 604 redundant fields in the blank form. For example, redundant fields store the same information or the same type of information on a form, such as, a list of purchases (e.g., business lunch, San Jose flight ticket, etc.) on an expense report or a list of health conditions (e.g., asthma, diabetes, etc.) on a patient medical history. The authoring module 204 identifies 606 associated fields in the blank form. Referring to FIG. 3, the authoring module 204 receives a selection of redundant fields $A_1$ 307, $B_1$ 309 and $C_1$ 311 (illustrated with small dashes) under the label "Expense Category" 301, the label "Descriptions" 303 and the label "Amount" 305 in the form. Each redundant field is storing information of a different type and the authoring module 204 groups the selected redundant fields together as a set of associated fields.

Figure 7:
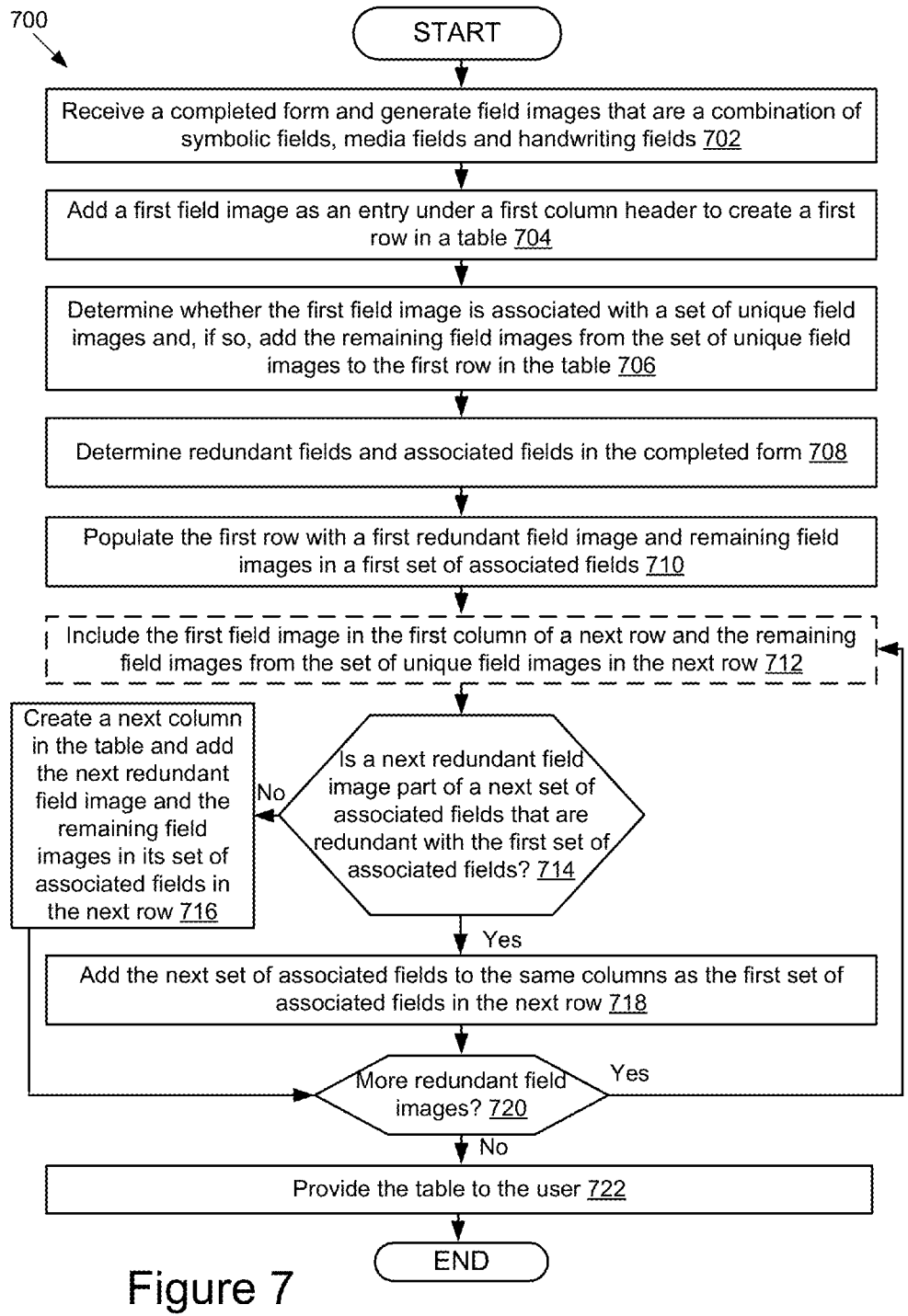
FIG. 7 is a flow diagram of one embodiment of a method for creating a table including multiple rows for a form.

FIG. 7 is a flow diagram 700 of an embodiment of a method for creating a table including multiple rows for a completed form. The table creation module 108 includes an image generator 208, a table generator 210 and a user interface engine 212. The image generator 208 receives 702 a completed form and generates field images that are a combination of symbolic fields, media fields and handwriting fields. In one embodiment, the image generator 208 generates a field image for handwriting fields by rendering handwriting strokes, generates a field image for media fields by rendering the media and generates a field image for symbolic fields by rendering a graphical representation of symbolic fields (e.g., a square check box, a circular radio button, etc.) and any change introduced by user action (e.g., checking or unchecking a checkbox). The table generator 210 adds 704 a first field image as an entry under a first column header to create a first row in a table. In one embodiment, a form has enough fields to create multiple rows in the table. The table generator 210 determines 706 whether the first field image is associated with a set of unique field images and, if so, adds the remaining field images from the set of unique field images to the first row in the table. For example, the unique field images are non-redundant in a completed form and include information about the user filling up the form, such as, name, date, email address, signature, etc. If the first field image is not associated with a set of unique field images, the method proceeds to the next step.

The table generator 210 determines 708 redundant fields and associated fields in the completed form. For example, referring to FIG. 4, in an expense report form, redundant fields include fields, such as, fields $A_1$ to $A_4$ storing the same type of information and a set of associated fields include a set of redundant fields, such as, $(A_1, B_1, C_1)$ where each redundant field is storing information of a different type under "Expense category", "Description" and "Amount." The table generator 210 populates 710 the first row with a first redundant field image and remaining field images in a first set of associated fields. For example, referring to FIG. 5A, the table generator 210 adds the field images "Travel" 515, "Taxi ride" 517 and "$35" 519 from a first set of associated fields to the first row of the table. In an optional embodiment, the table generator 210 includes 712 the first field image in the first column of a next row and the remaining field images from the set of unique field images in the next row. For example, in FIG. 5, the table generator 210 adds the common field images "Oscar Mike" 502, "Jul. 1, 2013" 504, "mike@pqr.com" 506 and "Engineering" 508 in the next row of the table.

The table generator 210 determines 714 whether a next redundant field image is part of a next set of associated fields that are redundant with the first set of associated fields. For example, referring to FIG. 3, if the form has a list of two expenses filled, such as, expenses associated with Travel and Consultant fees, in the set of associated fields $(A_1, B_1, C_1)$ and $(A_2, B_2, C_2)$. The set of associated fields $(A_1, B_1, C_1)$ is redundant with the set of associated fields $(A_2, B_2, C_2)$. If the next redundant field image is part of the next set of associated fields, the table generator 210 adds 718 the next set of associated fields to the same columns as the first set of associated fields in the next row of the table. After adding the next set of associated fields to the same columns as the first set, the table generator 210 determines 720 whether more redundant field images exist.

If the next redundant field image is not part of the next set of associated fields that are not redundant with the first set of associated fields, the table generator 210 creates 716 a next column in the table and adds the next redundant field image and the remaining field images in its set of associated fields in the next row of the table. For example, if the form in FIG. 3 has a list of two mileage entries filled, such as, mileages associated with traveling to the San Jose Airport and the Little America Hotel, in the associated fields $(D_1, E_1, F_1)$ and $(D_2, E_2, F_2)$, the table generator 210 generates the next three columns (using the labels of associated fields $(D_1, E_1, F_1)$) and two additional rows in the table for first the form. The field images from the associated fields $(D_1, E_1, F_1)$ and $(D_2, E_2, F_2)$ are populated under the next three columns on the two additional rows in the table. After creating the next column for adding the redundant field image and the remaining field images in the next row, the table generator 210 determines 720 whether more redundant field images exist.

If more redundant field images are determined, then the table generator 210 in an optional embodiment includes 712 the first field image in the first column of the next row and the remaining field images from the set of unique field images in the next row. Following that, the table generator 210 repeats the steps 714 through 718 once more. If more redundant field images are not determined, then the table generator 210 instructs the user interface engine 212 to generate graphical data for displaying the table and provide 722 the table to the user via the communication unit 255.

Figure 8A:
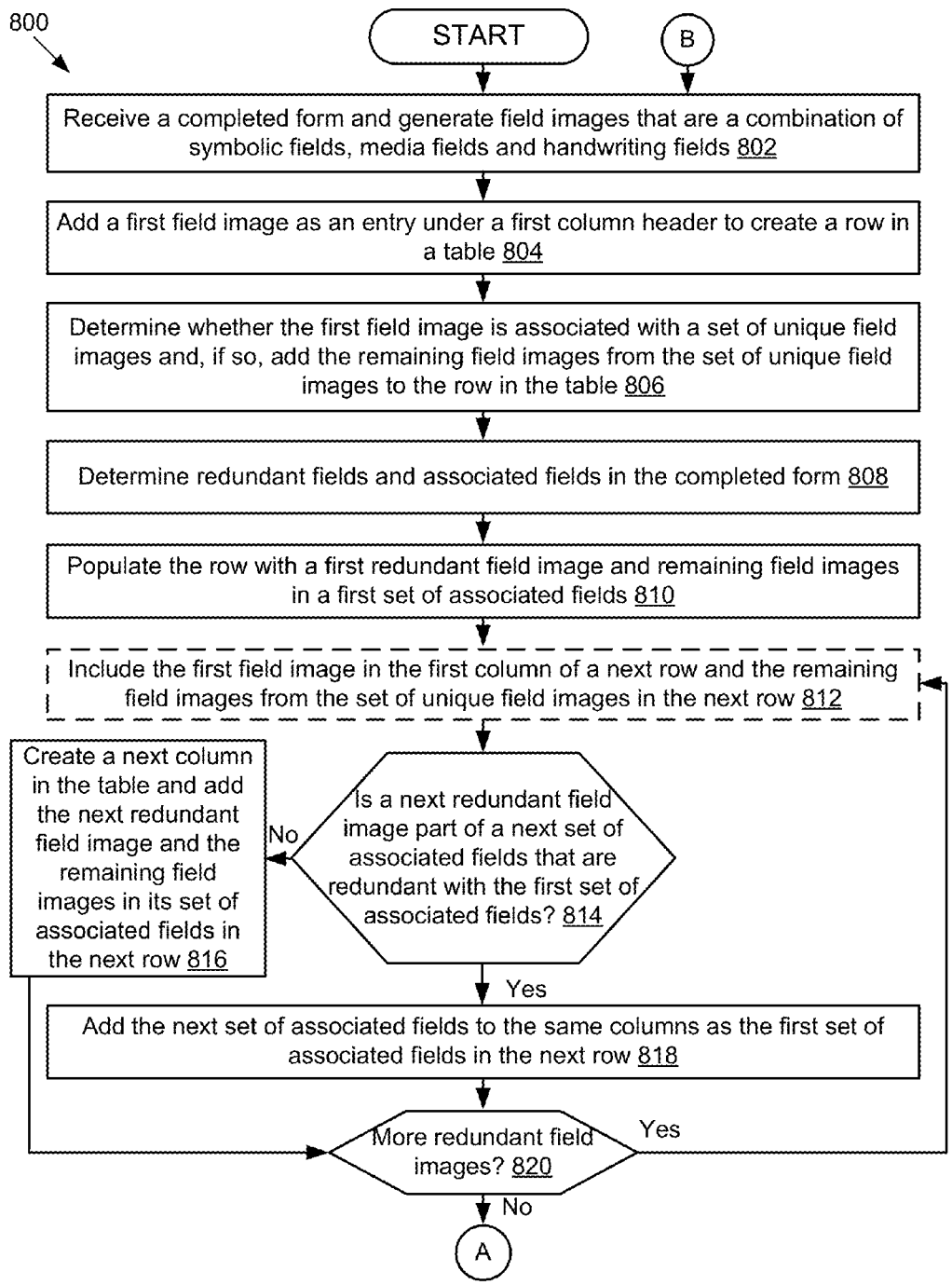
FIGS. 8A and 8B are flow diagrams of one embodiment of a method for creating a table including multiple rows per form image for a plurality of forms.
Figure 8B:
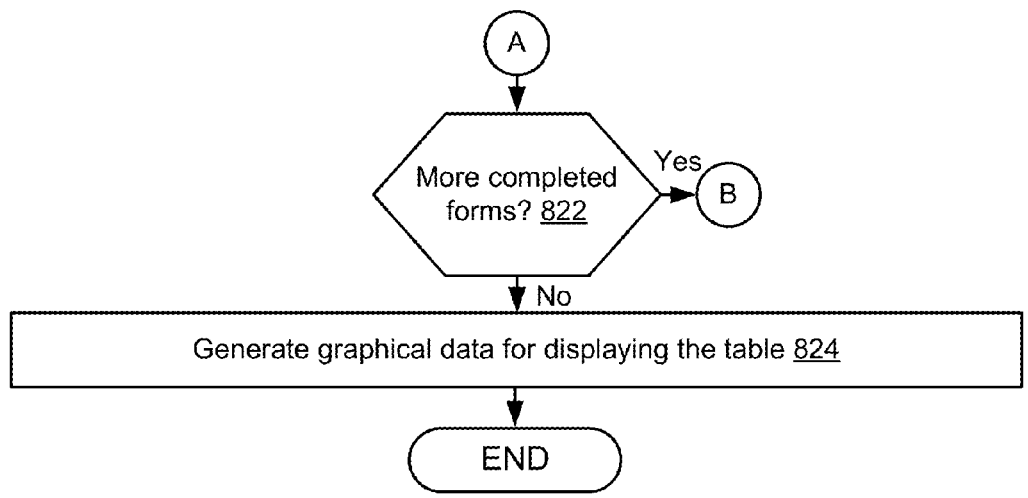

FIGS. 8A and 8B are flow diagram 800 that illustrates one embodiment of a method for creating a table including multiple rows per form for a plurality of forms. The table creation module 108 includes an image generator 208, a table generator 210 and a user interface engine 212. The image generator 208 receives 802 a completed form and generates field images that are a combination of symbolic fields, media fields and handwriting fields. In one embodiment, the image generator 208 generates a field image for handwriting fields by rendering handwriting strokes, generates a field image for media fields by rendering the media and generate a field image for symbolic fields by rendering a graphical representation of symbolic fields (e.g., a square check box, a circular radio button, etc.) and any change introduced by user action (e.g., checking or unchecking a checkbox). The table generator 210 adds 804 a first field image as an entry under a first column header to create a row in a table. A form introduces multiple rows in the table. The table generator 210 determines 806 whether the first field image is associated with a set of unique field images and, if so, adds the remaining field images from the set of unique field images to the row in the table. For example, the unique field images are non-redundant in a completed form and include information about the user filling up the form, such as, name, date, email address, signature, etc. If the first field image is not associated with a set of unique field images, the method proceeds to the next step.

The table generator 210 determines 808 redundant fields and associated fields in the completed form. For example, referring to FIG. 4, in an expense report form, redundant fields include fields, such as, fields $A_1$ to $A_4$ storing same type of information and a set of associated fields include a set of redundant fields, such as, $(A_1, B_1, C_1)$ where each redundant field is storing information of a different type under "Expense category", "Description" and "Amount." The table generator 210 populates 810 the row with a first redundant field image and remaining field images in a first set of associated fields. For example, referring to FIG. 5B, the table generator 210 adds the field images "Travel" 515, "Taxi ride" 517 and "$35" 519 from a first set of associated fields to the row of the table. In an optional embodiment, the table generator 210 includes 812 the first field image in the first column of a next row and the remaining field images from the set of unique field images in the next row. For example, in FIG. 5B, the table generator 210 adds the common field images "Oscar Mike" 502, "Jul. 1, 2013" 504, "mike@pqr.com" 506 and "Engineering" 508 in the next row of the table.

The table generator 210 determines 814 whether a next redundant field image is part of a next set of associated fields that are redundant with the first set of associated fields. For example, referring to FIG. 3, if the form has a list of two expenses filled, such as, expenses associated with Travel, Consultant fees, in the set of associated fields $(A_1, B_1, C_1)$ and $(A_2, B_2, C_2)$. The set of associated fields $(A_1, B_1, C_1)$ is redundant with the set of associated fields $(A_2, B_2, C_2)$. If the next redundant field image is part of the next set of associated fields, the table generator 210 adds 818 the next set of associated fields to the same columns as the first set of associated fields in the next row of the table. After adding the next set of associated fields to the same columns as the first set, the table generator 210 determines 820 whether more redundant field images exist.

If the next redundant field image is not part of the next set of associated fields that are not redundant with the first set of associated fields, the table generator 210 creates 816 a next column in the table and adds the next redundant field image and the remaining field images in its set of associated fields in the next row of the table. For example, if the form in FIG. 3 has a list of two mileage data filled, such as, mileages associated with traveling to San Jose Airport and the Little America Hotel, in the associated fields $(D_1, E_1, F_1)$ and $(D_2, E_2, F_2)$, the table generator 210 generates the next three columns (using the labels of associated fields $(D_1, E_1, F_1)$) and two additional rows in the table for first field image. The field images from the associated fields $(D_1, E_1, F_1)$ and $(D_2, E_2, F_2)$ are populated under the next three columns on the two additional rows in the table. After creating the next column for adding the redundant field image and the remaining field images in the next row, the table generator 210 determines 820 whether more redundant field images exist.

If more redundant field images exist, then the table generator 210 in an optional embodiment includes 812 the first field image in the first column of the next row and the remaining field images from the set of unique field images in the next row. Following that, the table generator 210 repeats the steps 814 through 818 once more. If more redundant field images are not determined, then the table generator 210 determines 822 whether more completed forms are to be added to the table. If another completed form is identified, then the image generator 208 receives 802 the completed form and generates field image that are a combination of symbolic fields, media fields and handwriting fields. Following that, the table generator 210 repeats the steps 804 through 820 once more.

If more completed forms are not identified, then the table generator 210 instructs the user interface engine 212 to generate 824 graphical data for displaying the table in a user interface.

The foregoing description of the embodiments has been presented for the purposes of illustration and description. It is not intended to be exhaustive or to limit the specification to the precise form disclosed. Many modifications and variations are possible in light of the above teaching. It is intended that the scope of the embodiments be limited not by this detailed description, but rather by the claims of this application. As will be understood by those familiar with the art, the examples may be embodied in other specific forms without departing from the spirit or essential characteristics thereof. Likewise, the particular naming and division of the modules, routines, features, attributes, methodologies and other aspects are not mandatory or significant, and the mechanisms that implement the description or its features may have different names, divisions and/or formats. Furthermore, as will be apparent to one of ordinary skill in the relevant art, the modules, routines, features, attributes, methodologies and other aspects of the specification can be implemented as software, hardware, firmware or any combination of the three. Also, wherever a component, an example of which is a module, of the specification is implemented as software, the component can be implemented as a standalone program, as part of a larger program, as a plurality of separate programs, as a statically or dynamically linked library, as a kernel loadable module, as a device driver, and/or in every and any other way known now or in the future to those of ordinary skill in the art of computer programming. Additionally, the specification is in no way limited to implementation in any specific programming language, or for any specific operating system or environment. Accordingly, the disclosure is intended to be illustrative, but not limiting, of the scope of the specification, which is set forth in the following claims.

What is claimed is:

1. A computer-implemented method comprising:
receiving a first completed form;
generating field images that are a combination of symbolic fields and handwriting fields from the first completed form;
determining a set of unique field images from the generated field images;
creating a first row in a table and populating the first row with the set of unique field images under a first set of columns in the table;
determining redundant fields of the first completed form;

determining sets of associated fields in the first completed form, each set of associated fields grouping one or more of the redundant fields and each redundant field within each set of associated fields storing information of a different type;
populating the first row of the table with redundant field images from the generated field images that correspond to a first set of associated fields under a second set of columns in the table;
determining whether a second set of associated fields are redundant with the first set of associated fields;
responsive to determining that the second set of associated fields are redundant with the first set, creating a second row in the table and populating the second row with redundant field images from the generated field images that correspond to the second set of associated fields under the second set of columns in the table; and
populating the second row of the table with the set of unique field images under the first set of columns in the table.

2. The method of claim 1, further comprising:
responsive to determining that the second set of associated fields are not redundant with the first set, creating the second row in the table;
populating the second row of the table with the redundant field images from the generated field images that correspond to the second set of associated fields under a third set of columns in the table; and
populating the second row of the table with the set of unique field images under the first set of columns in the table.

3. The method of claim 2 further comprising:
receiving a second completed form;
determining a set of unique field images in the second completed form;
determining redundant fields of the second completed form;
determining sets of associated fields in the second completed form and redundant field images that correspond to the redundant fields within each set of associated fields in the second completed form;
creating an additional row in the table for each set of associated fields in the second completed form;
identifying, based on the sets of associated fields in the second completed form, the first set of columns in the table associated with the set of unique field images and the second and the third sets of columns associated with each set of associated fields; and
populating the additional row of the table with the set of unique field images under the first set of columns in the table and with the redundant field images that correspond to each set of associated fields under the second and the third set of columns in the table.

4. The method of claim 1 further comprising providing the table to a user.

5. The method of claim 1, wherein determining redundant fields and sets of associated fields comprises:
receiving a blank form corresponding to the first completed form;
identifying fields in the blank form that are redundant with each other; and
identifying one or more of the fields as part of a set of associated fields wherein one set of associated fields is redundant with another set of associated fields.

6. The method of claim 1, wherein the field images that are the combination of symbolic fields and handwriting fields also include media fields.

7. The method of claim 1, further comprising:
receiving a request from a user device to modify the table;
retrieving at least one field image based on the request;
recreating the table with the at least one field image; and
providing the table to a user.

8. The method of claim 7, wherein the request is a filter request and the at least one field image matches the filter request.

9. A system comprising:
a processor;
an image generator stored on a memory and executable by the processor, the image generator configured to receive a first completed form and to generate field images that are a combination of symbolic fields and handwriting fields from the first completed form; and
a table generator stored on the memory and executable by the processor, the table generator coupled to the image generator and configured to determine a set of unique field images from the generated field images, to create a first row in a table and populate the first row with the set of unique field images under a first set of columns in the table, to determine redundant fields of the first completed form, to determine sets of associated fields in the first completed form, each set of associated fields grouping one or more of the redundant fields and each redundant field within each set of associated fields storing information of a different type, to populate the first row of the table with redundant field images from the generated field images that correspond to a first set of associated fields under a second set of columns in the table, to determine whether a second set of associated fields are redundant with the first set of associated fields, responsive to determining that the second set of associated fields are redundant with the first set, to create a second row in the table and populate the second row with redundant field images from the generated field images that correspond to the second set of associated fields under the second set of columns in the table and to populate the second row of the table with the set of unique field images under the first set of columns in the table.

10. The system of claim 9,
wherein the table generator, responsive to determining that the second set of associated fields are not redundant with the first set, is configured to create the second row in the table, to populate the second row of the table with the redundant field images from the generated field images that correspond to the second set of associated fields column under a third set of columns in the table and to populate the second row of the table with the set of unique field images under the first set of columns in the table.

11. The system of claim 10, further comprising:
the image generator is configured to receive a second completed form; and
wherein the table generator is configured to determine a set of unique field images in the second completed form, to determine redundant fields of the second completed form, to determine sets of associated fields in the second completed form and redundant field images that correspond to the redundant fields within each set of associated fields in the second completed form, to create an additional row in the table for each set of associated fields in the second completed form, to identify the first set of columns in the table associated with the set of unique field images and the second and the third set of columns associated with each set of associated fields in the second completed form storing redundant field images and to populate the additional row of the table with the set of unique field images under the first set of columns in the table and with the redundant field images that correspond to each set of associated fields under the second and the third set of columns in the table.

12. The system of claim 9, further comprising:
user interface engine stored on the memory and executable by the processor, the user interface engine configured to provide the table to a user.

13. The system of claim 9 further comprising an authoring module stored on the memory and executable by the processor, the authoring module coupled to the table generator and wherein the authoring module determines redundant fields and sets of associated fields by receiving a blank form corresponding to the first completed form, identifying fields in the blank form that are redundant with each other and identifying one or more of the fields as part of a set of associated fields wherein one set of associated fields is redundant with another set of associated fields.

14. The system of claim 9, wherein the field images that are the combination of symbolic fields and handwriting fields also include media fields.

15. The system of claim 9,
wherein the table generator is configured to receive a request from a user device to modify the table, to retrieve at least one field image based on the request and to recreate the table with the at least one field image; and provide the table to a user.

16. The system of claim 15, wherein the request is a filter request and the at least one field image matches the filter request.

17. A computer program product comprising a useable medium including a non-transitory computer readable program, wherein the computer readable program when executed on a computer causes the computer to:
receive a first completed form;
generate field images that are a combination of symbolic fields and handwriting fields from the first completed form;
determine a set of unique field images from the generated field images;
create a first row in a table and populate the first row with the set of unique field images under a first set of columns in the table;
determine redundant fields of the first completed form;
determine sets of associated fields in the first completed form, each set of associated fields grouping one or more of the redundant fields and each redundant field within each set of associated fields storing information of a different type;
populate the first row of the table with redundant field images from the generated field images that correspond to a first set of associated fields under a second set of columns in the table;
determine whether a second set of associated fields are redundant with the first set of associated fields;
responsive to determining that the second set of associated fields are redundant with the first set, create a second row in the table and populate the second row with redundant field images from the generated field images that correspond to the second set of associated fields under the second set of columns in the table; and
populate the second row of the table with the set of unique field images under the first set of columns in the table.

18. The computer program product of claim 17, wherein the computer readable program further causes the computer to:
responsive to determining that the second set of associated fields are not redundant with the first set, create a the second row in the table;
populate the second row of the table with the redundant field images from the generated field images that correspond to the second set of associated fields under a third set of columns in the table; and
populate the second row of the table with the set of unique field images under the first set of columns in the table.

19. The computer program product of claim 18, wherein the computer readable program further causes the computer to:
receive a second completed form;
determine a set of unique field images in the second completed form;
determine redundant fields of the second completed form;
determine sets of associated fields in the second completed form and redundant field images that correspond to the redundant fields within each set of associated fields in the second completed form;
create an additional row in the table for each set of associated fields in the second completed form;
identify the first set of columns in the table associated with the set of unique field images and the second and the third set of columns associated with each set of associated fields in the second completed form storing redundant field images; and
populate the additional row of the table with the set of unique field images under the first set of columns in the table and with the redundant field images that correspond to each set of associated fields under the second and the third set of columns in the table.

20. The computer program product of claim 17, wherein the field images that are the combination of symbolic fields and handwriting fields also include media fields.

\* \* \* \* \*